United States Patent [19]

Brunelli et al.

[11] Patent Number: 5,255,619
[45] Date of Patent: Oct. 26, 1993

[54] PROCESS FOR MAKING LOOPED TEXTILE SLEEVES HAVING TRANSVERSE SEAMS FOR DRIVING BELTS

[75] Inventors: Renato Brunelli, Pescara; Giulio D'Alessandero, Cepagatti; Alessandro Pisoni, Pescara, Italy

[73] Assignee: Pirelli Trasmissioni Industriale S.p.A., Chieti, Italy

[21] Appl. No.: 783,676

[22] Filed: Oct. 29, 1991

[30] Foreign Application Priority Data

Oct. 29, 1990 [IT] Italy .................. 21898 A/90
Oct. 29, 1990 [IT] Italy .................. 21899 A/90

[51] Int. Cl.⁵ .............. D05B 35/10; D05B 35/12; B29C 53/36
[52] U.S. Cl. .................. 112/63; 112/262.3; 112/306; 112/121.27; 226/24; 156/137
[58] Field of Search ............ 112/63, 60, 147, 303, 112/304, 301, 307, 262.3, 262.2, 10, 121.27; 156/157, 159, 304.1, 304.5, 127; 226/10, 16, 17, 24, 32, 33, 45, 100; 271/225, 227, 239

[56] References Cited

U.S. PATENT DOCUMENTS

| | | | |
|---|---|---|---|
| 3,227,118 | 1/1966 | Gore | 112/10 |
| 4,214,541 | 7/1980 | Zeigler | 112/303 X |
| 4,323,786 | 4/1982 | Snow | 250/559 |
| 4,465,531 | 8/1984 | Araki et al. | 156/64 |
| 4,787,525 | 11/1988 | Black et al. | 112/262.3 X |
| 4,858,546 | 8/1989 | Adamski et al. | 112/304 X |
| 4,878,985 | 11/1989 | Thomsen et al. | 156/137 X |
| 4,932,344 | 6/1990 | Tatum | 112/147 X |
| 4,968,369 | 11/1990 | Darcy et al. | 156/217 |
| 4,993,334 | 2/1991 | Henze et al. | 112/306 X |
| 5,020,460 | 6/1991 | Babson et al. | 112/306 X |
| 5,030,313 | 7/1991 | Takeda et al. | 156/304.5 |
| 5,152,235 | 10/1992 | Goto et al. | 112/63 |

FOREIGN PATENT DOCUMENTS

| | | |
|---|---|---|
| 0006009 | 12/1979 | European Pat. Off. . |
| 3639972 | 5/1988 | Fed. Rep. of Germany . |
| 3730923 | 3/1989 | Fed. Rep. of Germany . |
| 0133034 | 7/1984 | Japan . |
| 61-86355 | 5/1986 | Japan . |

Primary Examiner—Clifford D. Crowder
Assistant Examiner—Ismael Izaguirre
Attorney, Agent, or Firm—Stevens, Davis, Miller & Mosher

[57] ABSTRACT

In a process and apparatus to automatically make textile sleeves for toothed belts, a continuously fed fabric 4a is cut to obtain a plurality of cloths 7 of predetermined sizes. The cloths 7 are joined together by sewing them along respective edges that are perpendicular to the cut thus forming a continuous textile band 12. The front end 12b of the textile band 12 is locked to a predetermined position after a band moving step is carried out. During the movement, a photoelectric cell 46 and an encoder 28 identify the distance between the front end 12b of the band and the first connecting seam 12a. If this distance is less than a minimum value, the band 12 is cut upstream of the seam 12a and the moving step is repeated. If the distance exceeds the minimum value, the band is formed into a loop 44 of predetermined width. During this step the distance between the last connecting seam 12a and the point of the cut is identified to establish whether the band 12 is to be cut and a sleeve formed with the obtained length 20 or whether it is necessary to modify the width of the loop 44 so as to increase the distance beyond the minimum value.

34 Claims, 3 Drawing Sheets

PROCESS FOR MAKING LOOPED TEXTILE SLEEVES HAVING TRANSVERSE SEAMS FOR DRIVING BELTS

BACKGROUND OF THE INVENTION

Field of the Invention

The present invention relates to a process and an apparatus to automatically make textile sleeves having transverse seams spaced apart from each other beyond a minimum predetermined extent.

In greater detail, the invention has been conceived for the purpose of producing sleeves to be used in the manufacture of driving belts of the toothed type, to which particular reference will be made in the course of the present description.

However, the process and apparatus in reference also apply to the production of textile sleeves intended for other uses.

CROSS REFERENCE TO RELATED APPLICATION

This type of fabric band and its manufacture is disclosed in assignee's co-pending Italian Application 21 898 A/90 and 21 899 A/90 both of Oct. 29, 1990, the entire disclosures of both applications are hereby incorporated by reference.

BACKGROUND INFORMATION

It is known that in the manufacture of driving belts of the toothed type, the toothed belt surface is often lined with a particular fabric the presence of which favorably enhances the bending strength of the individual teeth, so that the belt will be able to transmit high torques.

The incorporation of a lining in belts including the use of a textile sleeve which is previously fitted on a matrix adapted for the belt molding and vulcanization before carrying out the wrapping on said matrix is well known. A resistant layer or layers are used in the form of textile cords, fiber glass cords and the like, as well as a layer or layers of elastomeric material.

Textile sleeves which must exhibit a given extensibility in the circumferential direction so that they may fit the outline of the matrix toothing, are obtained through successive cutting and sewing steps starting from a rubberized fabric which is initially extensible in the weft direction.

In greater detail, and as disclosed in the above referenced co-pending application, the fabric continuously fed is first transversely cut so as to obtain a number of cloths of predetermined sizes that are subsequently joined together one after the other by means of seams along respective edges perpendicular to the cut direction.

Thus a continuous textile band having transverse connecting seams is obtained and this band must be cut again in the transverse direction in order to obtain lengths of predetermined longitudinal extension.

The opposite ends of each length are then disposed close to each other and sewn together by a closing seam so as to achieve the desired textile sleeve.

It is apparent from the foregoing that each finished sleeve will have different transverse seams, represented by the final closing seam and by at least one of the cloth-joining seams respectively.

In most cases each sleeve has a single connecting seam in addition to the closing seam.

The distance between these two seams varies at random from one sleeve to another depending upon the position in which the connecting seam is when the cutting operations for the achievement of a length are carried out.

However it is to be noted that, to obtain the desired belt strength, it is of the greatest importance that the minimum distance between the seams in the circumferential direction of the sleeve should not be less than a predetermined value generally on the order of 8 to 10 cm.

At the present state of the art, in which the presence of an operator is provided for the execution of every cutting and sewing operation, the operator carrying out the cut on the continuous band for the achievement of lengths thereof is also entrusted with the task of verifying the distance between the seams.

When the front end of the continuous band is too close to a connecting seam, the operator will execute an auxiliary cut upstream of the seam so that the new front end will be sufficiently far from the following connecting seam.

Likewise, when the rear end of the length to be cut is too close to the connecting seam immediately downstream of the cutting line, the operator will cut off a scrap of appropriate length from the front side of the band, so that the connecting seam will be sufficiently spaced away from the rear end of the length to be cut to size.

After the above premises, it should be pointed out that the present assignee has recently developed and perfected an apparatus capable of carrying out all cutting and sewing operations provided in the manufacture of sleeves, in a completely automatic manner.

This apparatus, as cross referenced above, has proved to be perfectly capable of fulfilling its intended task, enabling important savings in working time and manpower to be achieved and, above all, a remarkable increase in the qualitative reliability of the product thus obtained.

It is however to be pointed out that the use of the apparatus as described in the above patent application results in an important amount of working scraps, due to the lack of any device capable of avoiding the formation of sleeves having seams which are too close to each other.

SUMMARY OF THE INVENTION

The main object of the present invention is substantially to solve the problems connected with the use of the above apparatus, by giving it the capability of timely identifying, before carrying out the cutting of a length, the conditions according to which the length which is about to be cut would give origin to a sleeve having too close seams, and therefore automatically avoiding a finished sleeve having such a defect.

The foregoing and further objects that will become more apparent in the course of the present description are substantially attained by a process for automatically manufacturing textile sleeves having transverse seams spaced apart from each other beyond a minimum predetermined extent, characterized in that it comprises the following steps:

forming a continuous textile band by means of a plurality of cloths consecutively joined by transverse connecting seams;

longitudinally moving the band so as to dispose and secure the front end thereof according to a predetermined positioning;

dragging along the band in a controlled manner over a portion thereof immediately upstream of its front end in order-to form a loop having a predetermined length on the longitudinal extension of the band itself;

transversely cutting the band at a predetermined point upstream of said loop, in order to obtain a length having a predetermined longitudinal extension;

moving the ends of the length close to each other and joining them together by a closing seam, so as to form a textile sleeve of the desired circumferential extension;

examining one surface of the band for the first time in order to detect the passage of a first connecting seam on the cutting point during the controlled moving and dragging steps;

identifying for the first time the length of a leading portion of said band, passing on the cutting point from the moment at which the moving step begins to the detection of the passage of said first connecting seam, in order to selectively cause the execution of the controlled dragging step when the length of the leading portion exceeds a predetermined minimum value and of an auxiliary band-cutting step followed by a new longitudinal moving step, when the length of the leading portion is smaller than said minimum value;

examining the surface of the band for the second time in order to detect the passage of the last connecting seam on the cutting point during the controlled dragging step;

identifying for the second time the length of a trailing portion of said band, passing on the cutting point from the detection of the passage of the last connecting seam to the moment at which the controlled dragging step ends, in order to selectively cause the execution of the approaching and connecting steps when the length of the trailing portion exceeds said predetermined minimum value and the execution of an auxiliary controlled dragging step in order to modify the loop width and the trailing portion length when said length is smaller than the minimum value.

The above process is put into practice, still in accordance with the invention, by an apparatus for automatically manufacturing textile sleeves having transverse seams spaced apart from each other beyond a predetermined minimum extent, characterized in that it comprises:

a cutting station arranged to act on a textile band formed with a number of cloths consecutively joined together by means of connecting seams along respective end edges, for transversely cutting said band into lengths having a desired longitudinal extension;

transport means acting upstream of said cutting station for engaging the front end of the textile band and bring it to a predetermined position downstream of the cutting station;

a sewing station in which the opposite ends of each length are joined together so as to form a textile sleeve;

controlled dragging means acting between the cutting station and the sewing station for dragging along the band so as to form a loop having a predetermined length on the longitudinal extension thereof;

reading means acting on the textile band for detecting the passage of the connecting seam at the cutting station;

counting means cooperating with the reading means for detecting the length of a leading portion of the band passing the cutting station from the moment at which the moving of the band by the transport means begins to the moment at which the passage of a first connecting seam is detected by the reading means on the cutting station, as well as the length of a trailing portion of the band passing the cutting station from the moment at which the passage of the last connecting seam is detected at the cutting station to the moment at which the dragging of the band by said controlled dragging means ends;

control means to selectively actuate the controlled dragging means and the cutting station depending upon the length of the leading portion detected by the counting means, as well as selectively to actuate the controlled dragging means and the cutting station depending upon the length of the trailing portion detected by the counting means.

BRIEF DESCRIPTION OF THE DRAWINGS

Further features and advantages will be best understood from the detailed description of a preferred embodiment of a process and an apparatus to automatically produce textile sleeves having transverse seams spaced apart from each other beyond a predetermined minimum extent in accordance with the present invention taken hereinafter by way of non-limiting example with reference to the accompanying drawings, in which.

DESCRIPTION OF THE PREFERRED EMBODIMENT

Figure 1:
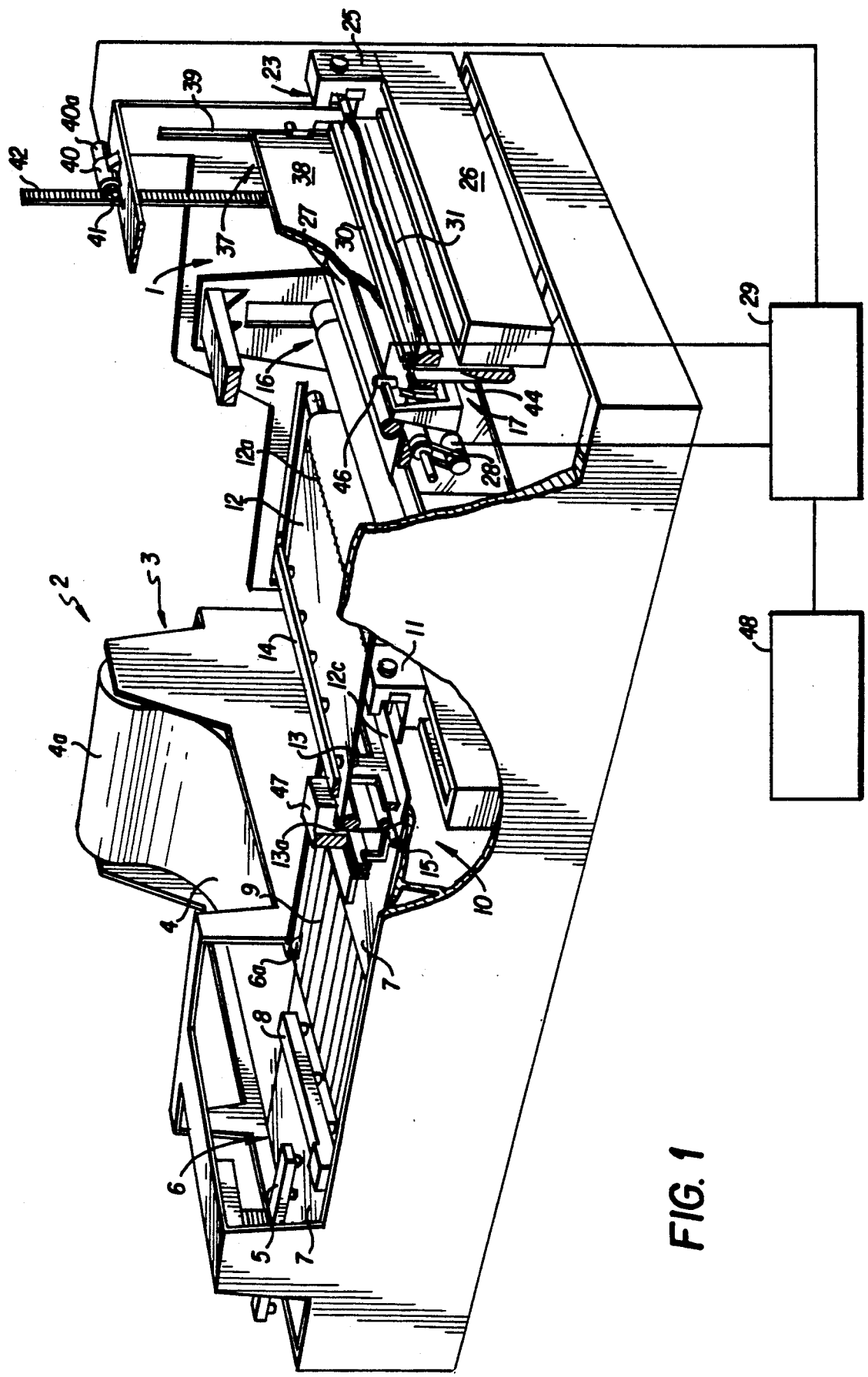
FIG. 1 is a perspective view of a machine to automatically make textile sleeves, in which the diagram of an apparatus adapted to avoid the formation of seams which are too closely spaced in accordance with the present invention is incorporated.

Referring to the drawings, an apparatus to automatically produce textile sleeves having transverse seams spaced apart from each other beyond a predetermined minimum extent in accordance with the present invention has been generally identified by reference numeral 1. Apparatus 1 is mounted to a machine generally denoted by 2, adapted to automatically make textile sleeves starting from a continuous fabric.

The automatic machine 2 will not be described in detail except for the parts that are closely linked to the present invention, since it has already been discussed in detail in the previously identified co-pending Italian patent application.

It is however to be pointed out that the automatic machine 2 essentially comprises a supply station 3 from which a continuous rubberized fabric 4 previously wound in the form of a roll 4a is drawn, upon the action of one gripping member 5 suitably disposing it on one cutting station 6.

One cutting member 6a associated with the cutting station 6 transversely cuts the fabric 4 thereby obtaining a number of pieces or cloths 7 which, upon the action of a second gripping member 8, are moved sideways, parallel to the direction of the executed cut, on a sliding surface 9 for engagement at a first connecting station 10.

In this connecting station 10 cloths 7, upon the action of one sewing machine 11, are sewn together by a seam along edges perpendicular to the direction of the previously carried out cut. In this way a continuous textile band 12 is formed which is provided with connecting seams 12a spaced apart from each other according to a pitch equal to the width of the fabric as supplied in the roll 4a. The textile band 12 is then moved forward on a suspended surface 13, by a third gripping member 14.

As can be seen from the accompanying figures, the third gripping member 14 acts so that, at each operating cycle of the connecting station 10, the textile band 12 is arranged so as to have its trailing end portion 12c suitably projecting from the trailing edge 13a of the suspended surface 13.

In this situation, the trailing end portion 12c can be folded under said trailing edge 13a upon the action of a thrust bar 15, in order to be sewn together with the end edge of the next upcoming cloth 7.

Figure 3:
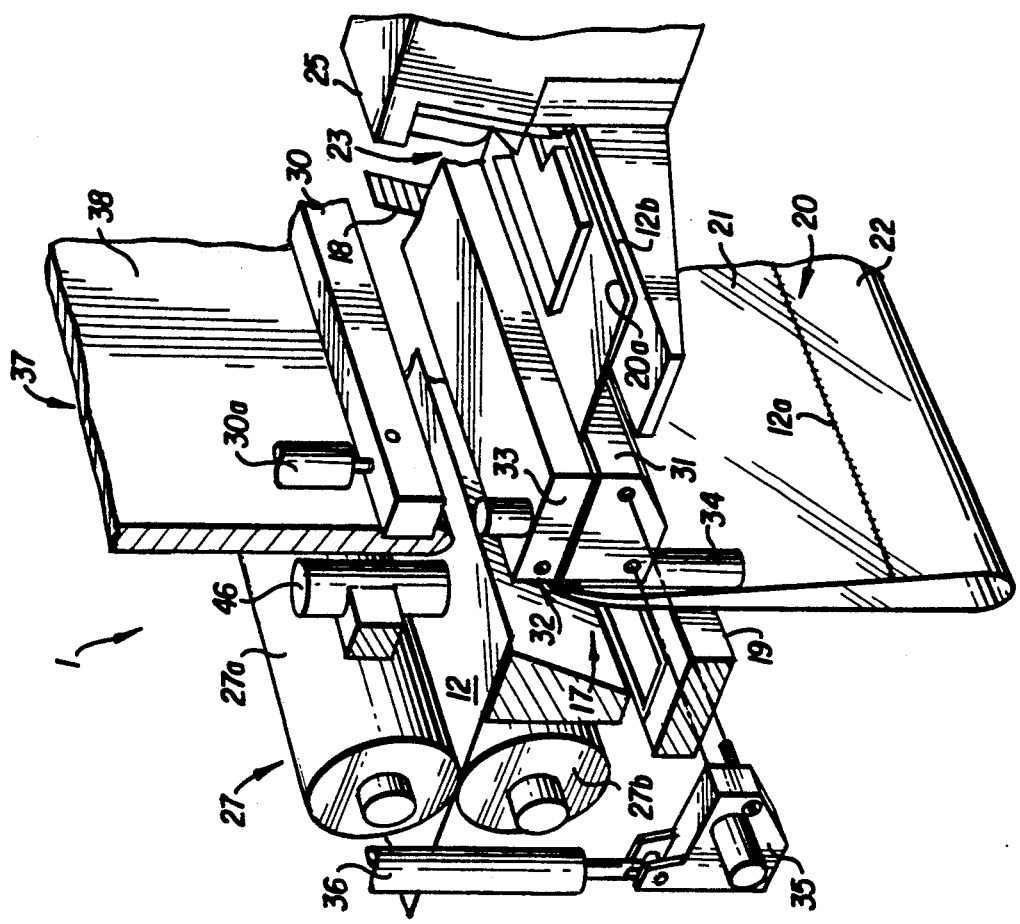
FIG. 3 shows a detail of FIG. 2 during a final step for the manufacture of a sleeve.
Figure 2:
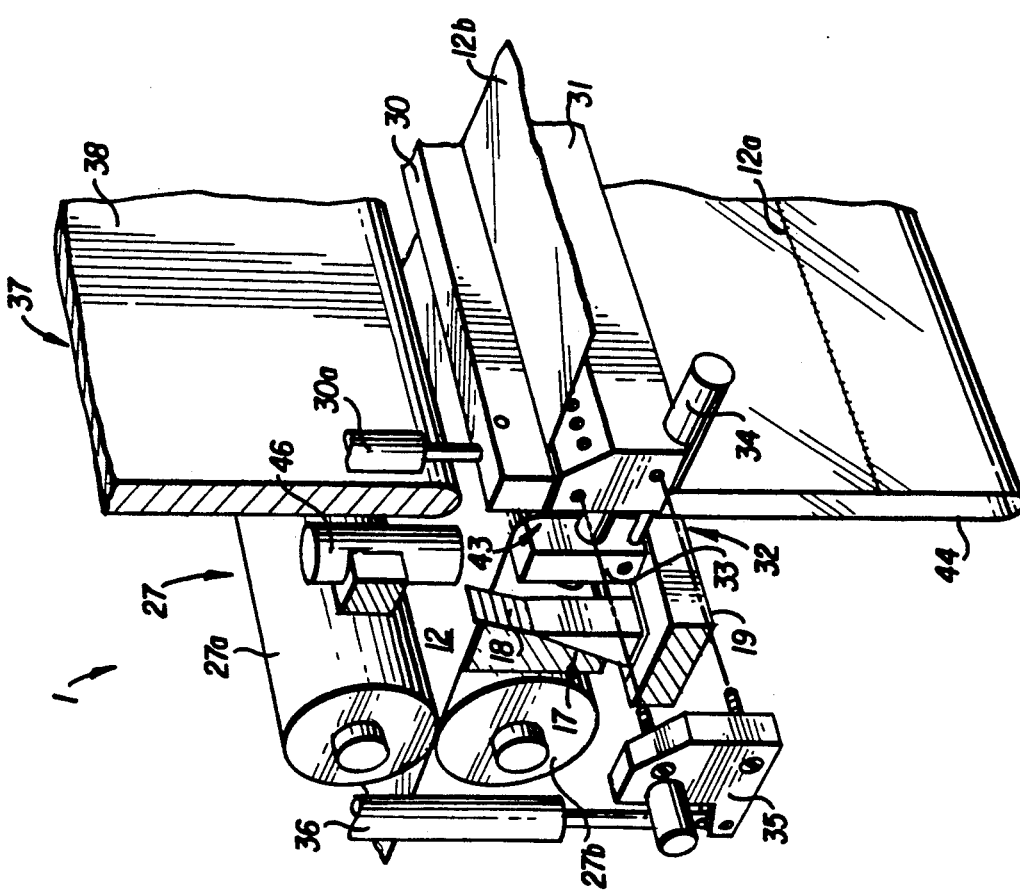
FIG. 2 is a perspective view on an enlarged scale of a detail of the machine incorporating the present apparatus, at the end of the loop-forming step for cutting to size a length from a textile band.
Figure 4:
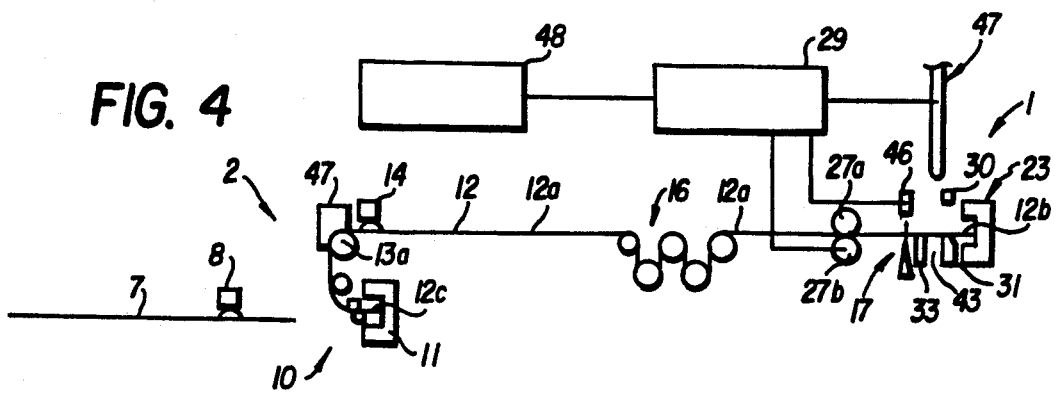
FIGS. 4 to 7 are diagrammatic side views showing different operating steps of the automatic machine incorporating the apparatus of the invention.
Figure 5:
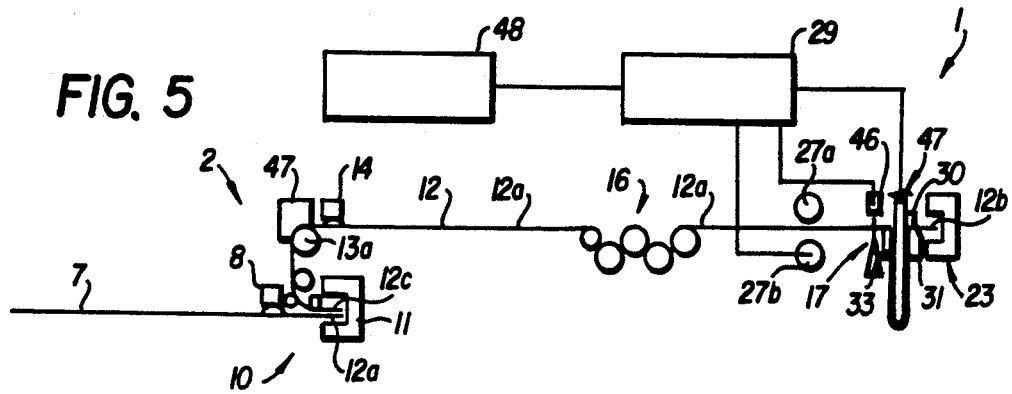
Figure 6:
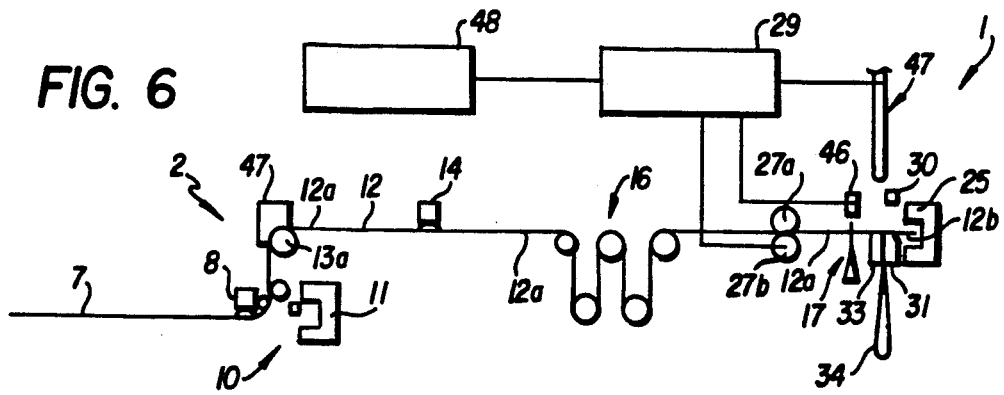

The band 12 moving away from the first connecting station 10 is engaged, after passing through a known and conventional storage device consisting of rollers 16, by a second cutting station 17 comprised, as more clearly shown in FIGS. 2 and 3, of a respective cutting member 18 operatively mounted to a guide 19 fastened to the machine 2 framework and movable at right angles to the longitudinal extension of the band for cutting it according to lengths 20 of the desired longitudinal extension. One or more connecting seams previously made for consecutively joining the cloths 7 will be present on each length 20.

The presence of these seams defines, on the longitudinal extension of the length 20, a leading portion 21 extending from the front end 12b which previously belonged to the band 12 as far as the first one of seams 12a, as well as a trailing portion 22 extending from the last one of said seams to the rear end 20a of the length 20, obtained from the cutting operation.

In the example shown (see FIGS. 2 and 3), the length 20 has only one connecting seam 12a which is therefore both the first and last of said seams.

Referring now to FIG. 1, downstream of the cutting station 17 there is a second connecting station or sewing station 23 where the opposite ends 12b, 20a of length 20 are joined together, after moving them close to each other, by a closing seam 24 carried out by a sewing machine 25 movable along respective guides 26, so as to create a textile sleeve of the desired circumferential extension.

The cutting station 17 and sewing station 23, together with the elements to be described in the following, form an integrating part of the apparatus of the invention.

The textile band 12 is fed to the cutting station 17 and the sewing station 23 by transport means 27 arranged to cause the longitudinal moving of the band so as to bring the front end 12b thereof to a predetermined position, downstream of the cutting station 17.

The transport means 27 preferably comprises a pair of opposite rollers 27a, 27b, operable in rotation under the control of an encoder 28 interlocked to driving means 29 comprising an electronic control box carrying out the operating management of all members in apparatus 1.

The rotation of the opposite rollers 27a, 27b is stopped when the front end 12b of the band 12 reaches a predetermined point, in engagement relation with the sewing machine 25.

Under this situation, the locking in position of the front end 12b is carried out by a locking bar 30 vertically movable, upon command of an actuator 30a, in the direction of a counterbar 31 located under the band 12.

The counterbar 31 is an integral part of a biting member 32 operating between the cutting station 17 and the sewing station 23, for the purposes to be described later.

This biting member 32 also comprises a closing bar 33 which, upon command of fluid-operated actuators 34 or the like, can be moved from a rest condition in which it is spaced apart from the counterbar 31, to an operating condition in which it acts in thrust relation on the counterbar.

In addition, the whole biting member 32 is oscillatably connected to the automatic machine 2 framework by supporting blocks 35, only one of Which is shown in the drawings; see FIGS. 2 and 3.

Figure 7:
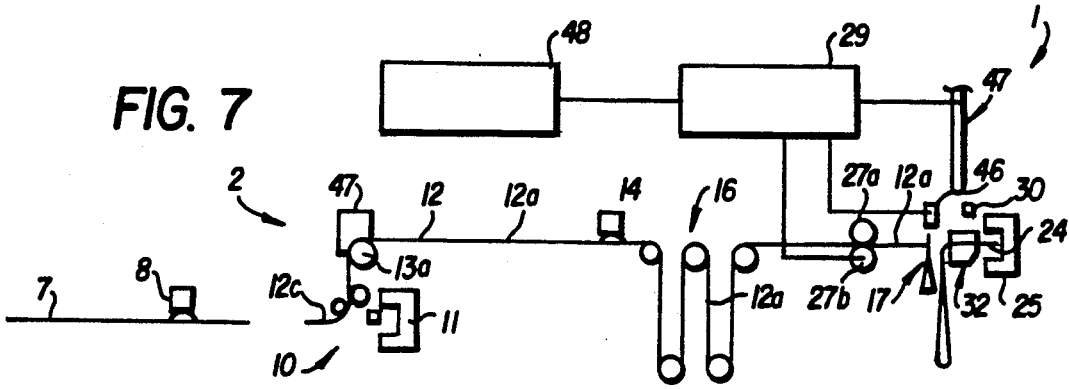

One or more actuators 36 acting on the supporting blocks 35 move the biting member 32 according to angular rotations of 90' about a horizontal axis, bringing it from a first working condition in which, as shown in FIGS. 1, 2, 4, 5 and 6, the counterbar 31 and thrust bar 33 are disposed in side by side relation according to a horizontal direction under the band 12, to a second operating condition in which, as shown in FIGS. 3 and 7, said bars are disposed in side by side relation according to a vertical direction.

In addition, apparatus 1 comprises controlled-dragging means, generally denoted by 37, arranged to drag the band 12 at a portion thereof upstream of its front end 12b, so that a loop 44 of the desired width is defined on the longitudinal extension of the band itself.

This controlled-dragging means 37 comprises a guillotine element 38 slidably guided in a vertical direction by means of guides 39 fastened to the machine 2 framework.

The guillotine element 38 is movable, as shown in FIG. 1, upon command of a motor 40 carrying a toothed wheel 41 meshing with a rack 42, through a slit 43 defined under the textile band 12 between the counterbar 31 and closing bar 33, when the closing bar is in the rest position and the biting member 32 is in the first operating condition.

Operation of the guillotine element 38 preferably takes place after moving rollers 27a, 27b apart from each other immediately after the front end 12b has been locked through the locking bar 30.

Due to the descent of the guillotine element 38 the textile band 12 is urged into the slit 43 thereby causing the formation of a loop 44, the length of which is controlled by a second encoder 40a associated with the motor 40 and interlocked to the electronic control box 29.

When the loop formation is completed, the band 12 is arranged so as to be cut by the cutting member 18 after raising the guillotine element 38, locking the driving rollers 27a, 27b against the band and moving the closing bar 33 close to the counterbar 31 in thrust relation therewith.

When the cut has been done, the locking bar 30 is raised from the counterbar 31 and the biting member 32 is brought to the second work condition, as shown in FIGS. 3 and 7.

Then the biting member 32 is overturned and thus the opposite ends of the length 20 obtained from the cutting operation are moved close to each other in overlapped relation.

Both said ends are now in operating engagement with the sewing machine 25 that will carry out the closing seam 24 thereby joining them together and forming the finished textile sleeve.

In accordance with the present invention the operating cycle of apparatus 1 also provides that during the initial moving step of the band 12 by rollers 27a, 27b in order to position and lock the front end 12b of the band itself, a first reading of one band surface should be executed in order to detect the passage of the first connecting seam 12a.

This reading step is carried out by sensor means, preferably consisting of one or more photoelectric cells 46 secured to the machine 2 framework and acting on the point where the cut by the cutting member 18 is to be carried out, or at any other previously established point.

The photoelectric cell 46 is connected to the electronic control box 29 to send a signal thereto at the moment that one of the connecting seams 12a passes by the cutting station 17. In order to facilitate the detection of the connecting seams 12a by the photoelectric cell 46, a seam marking step is preferably carried out on the band 12, upstream of said photoelectric cell.

The marking is executed by a marking unit 47 not described in detail as it is known and the details are not of importance to the ends of the invention. It preferably operates at the front edge 13a of the suspended surface 13.

This marking unit puts a reflective white mark on each connecting seam 12a, for example by means of chalk, paint, labels or other means; the mark can also be of another color which however must be capable of reflecting the light beam emitted by the photoelectric cell 46.

Simultaneously with the first reading step, one identification step for identifying the length of the leading portion 21 of the obtained piece or length is also carried out with the aid of the first encoder 28.

Preferably the identification is executed by enabling the photoelectric cell to read, starting from the moment at which the moving of the band 12 through the rollers 27a, 27b begins, and disenabling the photoelectric cell when the first encoder 28 has detected a displacement corresponding to the minimum distance value between the closing seam 24 and the nearest connecting seam 12a.

If during this step the photoelectric cell does not record the passage of any connecting seam 12a, it means that the leading portion 21 is longer than the minimum previously entered value and therefore the electronic control box 29 will command the execution of the controlled dragging step by the guillotine element 38, after locking the front end 12b by means of the locking bar 30.

If, on the other hand, the photoelectric cell 36 intercepts the passage of a connecting seam 12a during the first reading step, it means that the leading portion 21 of the obtained length is shorter than the previously entered minimum value.

In this case the electronic control box 29 will command the execution of an auxiliary cutting step by the cutting member 18, so as to cut off the band 12 upstream of the connecting seam 12a thereby producing a scrap of reduced length.

When the auxiliary cutting step has been completed, a new longitudinal-displacement step of the band 12 followed by the respective reading and identification steps, will begin.

In accordance with the operating cycle of the apparatus, at the end of the controlled dragging step of the band 12 upon the action of the guillotine element 38, a second reading step is carried out in order to detect the passage of the last seam 12a under the photoelectric cell 46. This reading step also is combined with a second identification step, carried out with the aid of the second encoder 40a, so as to detect the length of the trailing portion 22 of the length or piece 20 which is about to be formed.

Preferably the above identification is carried out by enabling the photoelectric cell 46 to read in register with a predetermined number of final pulses emitted by the second encoder 40a before the end of the controlled dragging step. Obviously, corresponding to said number of final pulses is the displacement of the band 12 according to the cited minimum length value.

If during this step the photoelectric cell does not detect the passage of any connecting seam 12a, the electronic control box 29 enables the execution of the cut on the band 12 by the cutting member 18, as well as the following operations concerning the approaching of the opposite ends of the length and the connecting of them.

If, on the other hand, the passage of a connecting seam 12a is detected, it means that the trailing portion 22 of the length which is about to be cut would have a lower length than the previously established minimum value. In this case therefore, the electronic control box 29 commands the execution of an auxiliary controlled dragging step so that, as a result, the length of the loop 44 will be modified and therefore also the length of the trailing portion 22 of the piece or length 20.

Preferably, the auxiliary controlled dragging step is preceded by a search step during which the electronic control box 29 examines a memory 48 in which different sizes for the sleeves to be made are stored.

The electronic control box 29 examines the various stored sizes searching for a longer size than that of the sleeve which was about to be made and, once it has found said size, causes a further descent of the guillotine element 38 in order to adapt the loop 44 to the formation of a sleeve having the new selected size.

The trailing portion 22 of the length 20 will become therefore longer and its length will exceed the minimum previously entered value.

Once the auxiliary controlled dragging step has been carried out, the electronic control box 29 enables apparatus 1 to execute the cut of the length 20 and to connect the opposite ends of the latter together, in order to obtain the finished sleeve without producing any scrap. Thus the present invention attains its intended purposes.

In fact the apparatus in question is capable of ensuring the production of sleeves, the seams of which are spaced apart from each other beyond a minimum predetermined extent, by automatically adapting itself to the formation of sleeves of different sizes so as to reduce as much as possible the production of scraps.

Obviously modifications and variations can be made to the invention as conceived, all of them falling within the scope of the invention as defined by the appended claims.

We claim:

1. A process for automatically manufacturing textile sleeves having transverse seams spaced apart from each other beyond a minimum predetermined distance, comprising the following steps:

forming a continuous textile band by a plurality of fabric pieces or cloths consecutively joined by transverse connecting seams;

longitudinally moving the band so as to dispose and secure a front end thereof according to a predetermined position:

dragging along the band in a controlled manner over a portion thereof immediately upstream of said front end in order to form a loop having a predetermined length on a longitudinal extension of said band;

transversely cutting the band at a predetermined point upstream of said loop, in order to obtain a piece or length of the band having a predetermined longitudinal extension;

moving the ends of the length close to each other and joining them by a closing seam, so as to form a textile sleeve of the desired circumferential length;

scanning one surface of the band for the first time in order to detect, adjacent the cutting point, a passage of a first connecting seam during the moving and controlled dragging steps;

detecting for the first time a length of the leading portion of said band passing the cutting point from the moment at which the moving step begins to the detection of the passage of said first connecting seam, in order to selectively command execution of the controlled dragging step when the length of the leading portion exceeds a predetermined minimum value and of an auxiliary band cutting step followed by a second longitudinal moving step, when the length of the leading portion is smaller than said minimum value;

scanning the surface of the band for a second time in order to detect, adjacent the cutting point, the passage of the previously detected connecting seam during the moving and controlled dragging step;

detecting for a second time the length of a trailing portion of said band passing the cutting point from the detection of the passage of the last connecting seam to the moment at which the controlled dragging step ends, in order to selectively command execution of the approaching and connecting steps when the length of the trailing portion exceeds said predetermined minimum value and execution of an auxiliary controlled dragging step in order to change the length of the loop and the length of the trailing portion when said trailing portion length is smaller than the minimum value.

2. The process according to claim 1, in which said auxiliary controlled dragging step is preceded by a search step for finding, in a memory containing various acceptable sizes of sleeves, a sleeve size larger than that of the sleeve which was about to be produced.

3. The process according to claim 1 in which prior to the longitudinal moving step of the band, a marking step is carried out on the connecting seams for facilitating the execution of said reading steps.

4. The process according to claim 1 in which the controlled dragging of the band is carried out by pushing the band into a transverse slit defined between the area in which the band cut is executed and the area in which the sleeve ends are moved close to each other and sewn together.

5. The process according to claim 1, in which the consecutive joining of said cloths along the respective edges takes place according to the following steps:

moving a first cloth on a horizontal suspended surface so that a rear end portion of the first cloth projects from a trailing edge of said suspended surface by a predetermined length;

folding over a rear end edge of said first cloth under the trailing edge of the suspended surface;

moving a second cloth to be joined to the first cloth on a horizontal slide surface located close to and at a lower position than the suspended surface so as to fit the front edge of said second cloth against the folded rear end edge of the first cloth;

sewing together the combined end edges of the first and second cloths to form a band;

moving the band on the suspended surface away from said trailing edge of said surface, in order to extend said band formed of said first and second cloths in coplanar relation and drag along the second cloth onto the suspended surface so that a rear end portion of the second cloth projects from said trailing edge by a predetermined amount so as to be ready to be folded over and joined to a third cloth.

6. The process according to claim 1, in which the consecutive joining of front and rear ends of the length of the band takes place by the steps of holding the band at the beginning and at the end of the loop and subsequently rotating the rear end of the loop in the downstream direction so as to place the rear end superposed over the front end of the loop.

7. A process for automatically manufacturing textile sleeves having transverse seams spaced apart from each other beyond a minimum predetermined distance, comprising the following steps:

forming a continuous textile band by a plurality of fabric pieces or cloths consecutively joined by transverse connecting seams;

longitudinally moving the band so as to dispose and secure a front end thereof according to a predetermined position:

scanning one surface of the band for the first time in order to detect, at a predetermined point, a passage of a first connecting seam during said moving step;

detecting for the first time a length of a leading portion of said band passing the predetermined point from the moment at which the moving step begins to the detection of the passage of said first connecting seam;

dragging along the band in a controlled manner over a portion thereof immediately upstream of its front end in order to form a loop having a predetermined length on the longitudinal extension of said band, in a situation where the length of the leading portion has been detected to be greater than the predetermined minimum value;

scanning the surface of the band for the second time in order to detect, at a predetermined point, the passage of the previously detected connecting seam during the controlled dragging step;

detecting for the second time the length of a trailing portion of said band passing the predetermined point from the detection of the passage of the previously detected connecting seam to the moment at which the controlled dragging step ends;

transversely cutting the band at said predetermined point, in order to obtain a piece or length of the band, having two ends and a predetermined longitudinal length, because the length of said trailing portion is detected to be greater than the predetermined minimum value;

moving the ends of the length of said piece or length of the band close to each other and joining them by a closing seam, so as to form a textile sleeve of the desired circumferential length.

8. A process for automatically manufacturing textile sleeves having transverse seams spaced apart from each other beyond a minimum predetermined distance, comprising the following steps:

forming a continuous textile band by a plurality of fabric pieces or cloths consecutively joined by transverse connecting seams;

longitudinally moving the band so as to dispose and secure a front end thereof according to a predetermined position;

scanning one surface of the band for the first time in order to detect, at a predetermined point, a passage of a first connecting seam during the moving step;

detecting for the first time a length of the leading portion of said band passing the predetermined point from the moment at which the moving step begins to the detection of the passage of said first connecting seam;

carrying out an auxiliary transverse cutting of the band at said predetermined point in order to separate a scrap portion of the band downstream of the predetermined point, because the length of said leading portion is detected to be smaller than a predetermined minimum value;

repeating the longitudinal moving step, the first scanning step and the first detection step;

dragging along the band in a controlled manner over a portion thereof immediately upstream of said front end in order to form a loop having a predetermined length on a longitudinal extension of said band because the length of the leading portion is detected to be greater than said predetermined minimum value;

scanning the surface of the band for a second time in order to detect the passage of the previously detected connecting seam at the predetermined point during the controlled dragging step;

detecting for a second time a length of the trailing portion of said band passing the predetermined point from the detection of the passage of the previously detected connecting seam to the moment at which the controlled dragging step ends;

transversely cutting the band at said predetermined point in order to obtain a cut length of the band having two ends and a predetermined longitudinal length;

moving the two ends of the cut length close to each other and joining them by a closing seam, so as to form a textile sleeve of the desired circumferential length.

9. A process for automatically manufacturing textile sleeves having transverse seams spaced apart from each other beyond a minimum predetermined distance, comprising the following steps:

forming a continuous textile band by a plurality of fabric pieces or cloths consecutively joined by transverse connecting seams;

longitudinally moving the band so as to dispose and secure a front end thereof according to a predetermined position:

scanning one surface of the band for the first time in order to detect, at a predetermined point, a passage of a first connecting seam during the moving step;

detecting for the first time a length of the leading portion of said band passing the predetermined point from the moment at which the moving step begins to the detection of the passage of said first connecting seam;

dragging along the band in a controlled manner over a portion thereof immediately upstream of said front end in order to form a loop having a predetermined length on a longitudinal extension of a band because the length of the leading portion is detected to be greater than a predetermined minimum value;

scanning the surface of the band for the second time in order to detect the passage of the previously detected connecting seam at the predetermined point during the controlled dragging step;

detecting for a second time a length of the trailing portion of said band passing the predetermined point from the detection of the passage of the previously detected connecting seam to the moment at which the controlled dragging step ends;

carrying out an auxiliary controlled dragging of the band in order to change the length of the loop and consequently the length of the trailing portion, because said length is detected to be smaller than the predetermined minimum value;

transversely cutting the band at said predetermined point in order to obtain a cut piece or length of the band having two ends and a predetermined longitudinal length;

moving the ends of the cut piece or length close to each other and joining them by a closing seam, so as to form a textile sleeve of the desired circumferential length.

10. A process for automatically manufacturing textile sleeves having transverse seams spaced apart from each other beyond a minimum predetermined distance, comprising the following steps:

forming a continuous textile band by a plurality of fabric pieces or cloths consecutively joined by transverse connecting seams;

longitudinally moving the band so as to dispose and secure a front end thereof according to a predetermined position:

scanning one surface of the band for the first time in order to detect, at a predetermined point, a passage of a first connecting seam during the moving step;

detecting for the first time a length of the leading portion of said band passing the predetermined point from the moment at which the moving step begins to the detection of the passage of said first connecting seam;

carrying out an auxiliary transverse cut of the band at said predetermined point in order to separate a scrap portion of the band downstream of said point, because the length of said leading portion is detected to be smaller than said minimum value;

repeating the longitudinal moving step, the first scanning and the first detection steps;

dragging along the band in a controlled manner over a portion thereof immediately upstream of said front end in order to form a loop having a predetermined length on a longitudinal extension of said band because the length of the leading portion is detected to be greater than said predetermined minimum value;

scanning the surface of the band for the second time in order to detect, at the predetermined point, the passage of the previously detected connecting seam during the controlled dragging step;

detecting for the second time a length of the trailing portion of said band passing the predetermined point from the detection of the passage of the previously detected connecting seam to the moment at which the controlled dragging step ends;

carrying out an auxiliary controlled dragging of the band in order to change the length of the loop and consequently the length of the trailing portion, because said length is detected to be less than the predetermined minimum value;

transversely cutting the band at said predetermined point, in order to obtain a cut piece or length having two ends and a predetermined longitudinal length;

moving the two ends of the cut piece or length close to each other and joining them by a closing seam, so as to form a textile sleeve of the desire circumferential length.

11. A process for making textile sleeves used in the manufacture of driving belts, comprising the following steps:

transversely cutting a continuously fed fabric so as to form a plurality of cloths of predetermined sizes;

moving the cloths so that respective edges of the cloth which were perpendicular to the cutting direction are now close to each other;

joining the cloths along the respective mutually approached edges so as to obtain a continuous textile band having a front end;

positioning and fixing the front end of the continuous band to a predetermined position;

dragging along the band in a controlled manner over a portion thereof immediately upstream of the front end thereof so as to form a loop of a desired length on the longitudinal length of the band;

transversely cutting the band at a predetermined location upstream of said loop so as to form a length of the desired longitudinal extension, said length having a rear end;

moving the front and rear ends of the obtained length of the band close to each other;

joining the front and rear ends of the length of the band so as to create a tubular sleeve having a predetermined circumferential.

12. The process according to claim 11, in which the consecutive approaching and joining of said cloths along the respective edges takes place according to the following steps:

moving a first cloth on a horizontal suspended surface so that a rear end portion of the first cloth projects from a trailing edge of said suspended surface by a predetermined length;

folding over a rear end edge of said first cloth under the trailing edge of the suspended surface;

moving a second cloth to be joined to the first cloth on a horizontal slide surface located close to and at a lower position than the suspended surface so as to fit the front edge of said second cloth against the folded rear end edge of the first cloth;

sewing together the combined end edges of the first and second cloths to form a band;

moving the band on the suspended surface away from said trailing edge of said surface, in order to extend said band formed of said first and second cloths in coplanar relation and drag along the second cloth onto the suspended surface so that a rear end portion of the second cloth projects from said trailing edge by a predetermined amount so as to be ready to be folded over and joined to a third cloth.

13. The process according to claim 11, in which the controlled dragging for the formation of the loop takes place at a location spaced apart by a distance from the front end of the band which is the same distance from the point of execution of the cut to the front end of the band.

14. The process according to claim 11, in which the controlled dragging along of the band is carried out by urging the band into a transverse slot defined between the area in which the band cut is performed and the area in which the approaching and joining of the band ends occurs.

15. The process according to claim 11, in which prior to the band cutting, the band is clamped and kept stretched over a portion thereof on which the cutting step is to be carried out.

16. The process according to claim 11, in which the mutual joining of the front and rear ends of the length takes place by the steps of holding the band at the beginning and at the end of the loop extension and subsequently rotating the rear end of the loop in the downstream direction so as to place the rear end superposed over the front end of the loop.

17. An apparatus for automatically manufacturing textile sleeves having transverse seams spaced apart from each other beyond a predetermined minimum length, comprising:

a cutting station for transversely cutting a textile band formed from a number of cloths consecutively connected by means of connecting seams along respective end edges;

transport means acting upstream of said cutting station for engaging a front end of the textile band and bringing the textile band to a predetermined position downstream of the cutting station;

a sewing station located downstream of said cutting station in which ends of each length of the band are sewn together so as to form a textile sleeve;

a controlled dragging means acting between the cutting station and the sewing station for dragging along the band so as to form a loop of a predetermined length on the longitudinal length of the band;

scanning means acting on the textile band for detecting the passage of the connecting seams adjacent the cutting station;

detecting means cooperating with the scanning means for identifying the length of a leading portion of the band passing the cutting station from the moment at which the moving of the band by the transport means begins to the moment at which the passage of a first connecting seam is detected by the scanning means as well as the length of a trailing portion of the band passing the cutting station from the moment at which the passage of the last connecting seam is detected to the moment at which the dragging of the band by said controlled dragging means ends;

control means to selectively actuate the controlled dragging means and the cutting station depending upon the length of the leading portion detected by the detecting means, as well as selectively to actuate the controlled dragging means and the cutting station depending upon the length of the trailing portion detected by the detecting means.

18. The apparatus according to claim 17, in which said scanning means comprises at least a photoelectric cell located adjacent the cutting station.

19. The apparatus according to claim 18, further comprising a marking unit acting upstream of the cutting station for applying a mark on each connection seam, said mark being adapted to reflect a light beam emitted by said photoelectric cell.

20. The apparatus according to claim 17, in which said detecting means comprises a first encoder associated with the transport means and a second encoder associated with the controlled dragging means.

21. The apparatus according to claim 17, in which said control means comprises an electronic control box connected to a memory in which data identifying a plurality of acceptable sizes of the sleeves to be made are stored.

22. The apparatus according to claim 17, in which said transport means comprises a pair of opposed rollers operable in rotation and acting on the textile band upstream of said cutting station.

23. The apparatus according to claim 17, comprising a biting member disposed under the textile band at a location between the cutting station and the second sewing station and having a counterbar and a closing bar defining a slit therebetween and with said loop being formed therebetween; said closing bar being mounted for movement towards the counterbar so as to hold the band at the beginning and the end of the loop before said cutting station is operated.

24. The apparatus according to claim 23, in which said controlled dragging means comprises a guillotine element disposed over the textile band and vertically movable to push said band into a slit defined between the counterbar and the closing bar of said biting member.

25. The apparatus according to claim 23, in which said biting member is angularly oscillatable from a first operating condition in which said counterbar and closing bar are disposed in side by side relation in a generally horizontal direction, to a second operating condition in which said bars are disposed in side by side relation in a generally vertical direction.

26. The apparatus according to claim 17, in which the first sewing station comprises:
a horizontal slide surface positioned for the cloths to be moved thereover by the action of a second grasping member;
a horizontal suspended surface located close to the slide surface;
a third grasping member movable along the suspended surface to move the textile band away from a trailing edge of the suspended surface facing the slide surface;
a thrust bar movable between the slide surface and the suspended surface to fold over one end edge of the band under the trailing edge of the suspended surface;
a first sewing machine movable parallel to an underside of the trailing edge of the suspended surface for sewing together said fabric cloths.

27. An apparatus to make textile sleeves used in the manufacture of driving belts, comprising:
a feed station carrying a continuous fabric being worked on;
a first cutting station located downstream of the feed station having means to transversely cut the fabric into a plurality of cloths of predetermined sizes;
a first grasping member movable longitudinally to the fabric to engage the fabric in the feed station and bring the fabric to a predetermined position on the first cutting station;
a first joining station for sewing together the obtained cloths one after the other along respective edges which are perpendicular to the cutting direction so as to form a continuous textile band;
a second grasping member movable at right angles to the movement direction of the first grasping member for picking up the individual cloths from the first cutting station and transporting said cloths to the joining station according to a predetermined positioning;
a second cutting station for cutting said textile band in a transverse direction so as to obtain fabric lengths having the desired longitudinal length;
transport means to engage a front end of the textile band upstream of the second cutting station and transport the front end to a predetermined position downstream of the cutting station;
a second joining station for joining together opposite ends of each fabric length so as to create a textile sleeve;
controlled-dragging means acting between the second cutting station and the second joining station for dragging along the band so as to form, on the longitudinal extension thereof, a loop of predetermined length.

28. The apparatus according to claim 27, in which the first joining station comprises:
a horizontal slide surface positioned for the cloths to be moved thereover by the action of the second grasping member;
a horizontal suspended surface located close to the slide surface;
a third grasping member movable along the suspended surface to move the textile band away from a trailing edge of the suspended surface facing the slide surface;
a thrust bar movable between the slide surface and the suspended surface to fold over one end edge of the band under the trailing edge of the suspended surface;
a first sewing machine movable parallel to the underside of the trailing edge of the suspended surface for sewing together said fabric cloths.

29. The apparatus according to claim 27, including a storage device made up of a plurality of rollers, acting between the first joining station and the second cutting station for storing the textile band thereon.

30. The apparatus according to claim 27, including said transport means comprising a pair of opposed rollers operable in rotation upon command of an encoder and acting on the textile band upstream of the second cutting station.

31. The apparatus according to claim 27, further comprising a clamping bar acting immediately upstream of the second joining station and vertically movable towards a counterbar for clamping the front end of the band before the controlled-dragging means is operated.

32. The apparatus according to claim 27, further comprising a biting member disposed under the textile band at a location between the second cutting station and the second joining station and comprising a counterbar and a closing bar between which a slot is defined and through which slot said loop is formed, said closing bar being movable towards the counterbar to hold the band at the beginning and at the end of the loop before the second cutting means is operated.

33. The apparatus according to claim 32, in which said controlled-dragging means comprises a guillotine element disposed above the band and vertically movable, upon command of an encoder, to urge the band into the slot defined between the counterbar and the closing bar of said biting member.

34. The apparatus according to claim 32, in which said biting member is mounted for angular oscillation from a first operating position in which the facing surfaces of the counterbar and closing bar are oriented vertically, to a second operating position in which said facing surfaces are oriented horizontally.

* * * * *